United States Patent
Kang et al.

(10) Patent No.: US 9,886,096 B2
(45) Date of Patent: Feb. 6, 2018

(54) METHOD AND APPARATUS FOR PROCESSING THREE-DIMENSIONAL (3D) OBJECT BASED ON USER INTERACTION

(71) Applicant: Samsung Electronics Co., Ltd., Suwon-si, Gyeonggi-do (KR)

(72) Inventors: Dongwoo Kang, Seoul (KR); Hyoseok Hwang, Seoul (KR); YangHo Cho, Seongnam-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/046,872

(22) Filed: Feb. 18, 2016

(65) Prior Publication Data

US 2017/0060253 A1 Mar. 2, 2017

(30) Foreign Application Priority Data

Sep. 1, 2015 (KR) .................. 10-2015-0123599

(51) Int. Cl.
*G06F 3/01* (2006.01)
*G06T 19/20* (2011.01)
*G06T 19/00* (2011.01)
*G06T 15/08* (2011.01)

(52) U.S. Cl.
CPC .............. *G06F 3/017* (2013.01); *G06T 15/08* (2013.01); *G06T 19/00* (2013.01); *G06T 19/20* (2013.01); *G06T 2200/24* (2013.01); *G06T 2207/10136* (2013.01); *G06T 2210/41* (2013.01)

(58) Field of Classification Search
CPC .............. G06T 7/0081; G06T 2210/41; G06T 2207/20101; G06T 2207/10136; G06T 2207/20141; A61B 8/466; A61B 8/469; G01S 15/8993
See application file for complete search history.

(56) References Cited

U.S. PATENT DOCUMENTS

| | | | |
|---|---|---|---|
| 6,608,628 B1 | 8/2003 | Ross et al. | |
| 7,880,726 B2 | 2/2011 | Nakadaira et al. | |
| 9,002,690 B2 | 4/2015 | Hart et al. | |
| 2005/0128196 A1* | 6/2005 | Popescu ................. | G01B 11/25 345/420 |
| 2013/0117717 A1 | 5/2013 | Song et al. | |
| 2013/0278499 A1 | 10/2013 | An | |
| 2014/0002441 A1* | 1/2014 | Hung .................... | G06T 7/0075 345/419 |

(Continued)

FOREIGN PATENT DOCUMENTS

| | | |
|---|---|---|
| JP | 2011215692 A | 10/2011 |
| JP | 2013167938 A | 8/2013 |

(Continued)

*Primary Examiner* — Saptarshi Mazumder
(74) *Attorney, Agent, or Firm* — Harness, Dickey & Pierce, P.L.C.

(57) ABSTRACT

A method for processing a three-dimensional (3D) object may including acquiring, based on an interaction of a user with at least one 3D object displayed on a 3D display, location information and depth information of pixels corresponding to the interaction. The method may including processing the at least one 3D object based on whether the location information and the depth information satisfy a depth continuity condition.

14 Claims, 9 Drawing Sheets

(56) References Cited

U.S. PATENT DOCUMENTS

| | | | |
|---|---|---|---|
| 2014/0152656 A1* | 6/2014 | Yoo | G06T 15/08 345/419 |
| 2014/0181755 A1 | 6/2014 | Oh et al. | |
| 2014/0328531 A1 | 11/2014 | Lee et al. | |
| 2014/0375777 A1 | 12/2014 | Chen et al. | |
| 2016/0005208 A1* | 1/2016 | Liao | G06T 15/405 345/422 |

FOREIGN PATENT DOCUMENTS

| | | |
|---|---|---|
| KR | 10-1208191 B1 | 12/2012 |
| KR | 20130050672 A | 5/2013 |
| KR | 10-1335394 B1 | 12/2013 |
| KR | 20150014127 A | 2/2015 |
| KR | 2015-0032028 A | 3/2015 |

* cited by examiner

800

METHOD AND APPARATUS FOR PROCESSING THREE-DIMENSIONAL (3D) OBJECT BASED ON USER INTERACTION

CROSS-REFERENCE TO RELATED APPLICATION

This application claims under 35 U.S.C. §119 to Korean Patent Application No. 10-2015-0123599, filed on Sep. 1, 2015, in the Korean Intellectual Property Office, the entire contents of which are incorporated herein by reference in its entirety.

BACKGROUND

1. Field

At least one example embodiment relates to a method and/or apparatus for processing a three-dimensional (3D) object based on an interaction of a user with the 3D object.

2. Description of the Related Art

To allow an interaction of a user with a two-dimensionally represented object, a touch input by, for example, a mouse, a pen or a finger may be used. Unlike the two-dimensionally represented object, an object represented in three-dimensions on a three-dimensional (3D) display for displaying a stereoscopic image has a stereoscopic depth. Because it is difficult to allow for interaction in a z-axis direction using a mouse, it is also difficult to precisely control or operate a three-dimensionally represented object.

SUMMARY

Some example embodiments relate to a method of processing a three-dimensional (3D) object.

In some example embodiments, the method may include sensing an interaction of a user with at least one 3D object displayed on a 3D display, acquiring location information and depth information of pixels corresponding to the interaction based on the interaction, and processing the at least one 3D object based on whether the location information and the depth information satisfy a depth continuity condition.

The sensing may include sensing a plurality of landmark points of the at least one 3D object pointed to by the user.

The acquiring may include interpreting the interaction and acquiring location information and depth information of pixels corresponding to the plurality of landmark points.

The processing may include segmenting the at least one 3D object based on the location information and the depth information of the pixels corresponding to the plurality of landmark points.

The segmenting may include determining whether at least one landmark point that does not satisfy the depth continuity condition is included in landmark points sensed by the interaction, and changing depth information of pixels corresponding to the at least one landmark point that does not satisfy the depth continuity condition, based on a result of the determining.

The determining may include determining, based on an input order and depth information of the sensed landmark points, whether the at least one landmark point that does not satisfy the depth continuity condition is included in the sensed landmark points.

The determining may include determining whether the at least one landmark point that does not satisfy the depth continuity condition is included in the sensed landmark points, based on whether depth information of pixels corresponding to at least one landmark point among the sensed landmark points satisfies a depth continuity regularization and depth information of pixels corresponding to landmark points neighboring the at least one landmark point.

The changing may include changing the depth information of the pixels corresponding to the at least one landmark point that does not satisfy the depth continuity condition, based on the depth information of the pixels corresponding to the neighboring landmark points.

The changing may include extracting at least one landmark point that does not satisfy the depth continuity condition, and changing depth information of pixels corresponding to the extracted landmark point.

The at least one 3D object may include a first object included in a first image and a second object included in a second image different from the first image. The sensing may include sensing a plurality of first landmark points of the first object pointed to by the user, and sensing a plurality of second landmark points of the second object pointed to by the user.

The acquiring may include interpreting an interaction of the user with the first object acquiring location information and depth information of first pixels corresponding to the first landmark points, interpreting an interaction of the user with the second object and acquiring location information and depth information of second pixels corresponding to the second landmark points.

The processing may include registering the first object and the second object based on the location information and the depth information of the first pixels and the location information and the depth information of the second pixels.

The registering may include registering the first object and the second object based on the location information of the first pixels and the location information of the second pixels, determining, based on depth information of landmark points sensed by the interaction, whether at least one landmark point that does not satisfy the depth continuity condition is included in a registration object generated by the registering, extracting the at least one landmark point that does not satisfy the depth continuity condition, based on a result of the determining, and changing depth information of pixels corresponding to the extracted landmark point.

The determining of whether the at least one landmark point that does not satisfy the depth continuity condition is included in the registration object may include determining whether the at least one landmark point that does not satisfy the depth continuity condition is included in the registration object, based on whether depth information of first pixels corresponding to at least one first landmark point and depth information of second pixels corresponding to at least one second landmark point satisfy a depth continuity regularization. Location information of the at least one first landmark point may correspond to location information of the at least one second landmark point.

The changing of the depth information of the pixels corresponding to the extracted landmark point may include changing depth information that does not satisfy the depth continuity regularization based on depth information that satisfies the depth continuity regularization, among the depth information of the first pixels and the depth information of the second pixels.

Other example embodiments relate to an apparatus for processing a 3D object.

In some example embodiments, the apparatus may include sensors configured to sense a plurality of landmark points of at least one 3D object pointed to by a user, the at least one 3D object being displayed on a 3D display, and a processor configured to acquire location information and depth information of pixels corresponding to the plurality of landmark points, and to process the at least one 3D object based on whether the location information and the depth information satisfy a depth continuity condition.

The processor may be configured to segment the at least one 3D object based on the location information of the pixels, to determine whether at least one landmark point that does not satisfy the depth continuity condition is included in the segmented 3D object, and to change depth information of pixels corresponding to the at least one landmark point that does not satisfy the depth continuity condition.

The at least one 3D object may include a first object included in a first image and a second object included in a second image different from the first image. The sensors may be configured to sense a plurality of first landmark points of the first object pointed to by the user and a plurality of second landmark points of the second object pointed to by the user. The processor may be configured to interpret an interaction of the user with the first object, to acquire location information and depth information of first pixels corresponding to the first landmark points, to interpret an interaction of the user with the second object and to acquire location information and depth information of second pixels corresponding to the second landmark points.

The processor may be configured to register the first object and the second object based on the location information of the first pixels and the location information of the second pixels, and to change depth information that does not satisfy the depth continuity regularization based on depth information that satisfies the depth continuity regularization, among the depth information of the first pixels and the depth information of the second pixels in a registration object generated by the registering.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
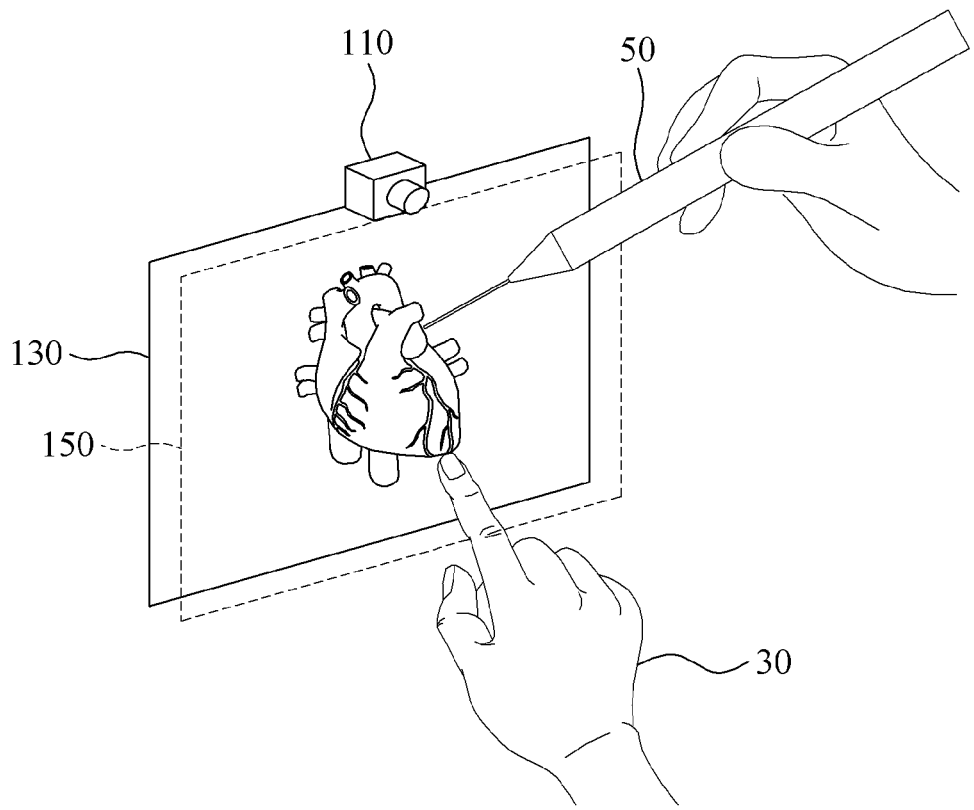
FIG. 1 is a diagram illustrating a three-dimensional (3D) display according to at least one example embodiment.

Hereinafter, some example embodiments will be described in detail with reference to the accompanying drawings. The scope of the present disclosure, however, should not be construed as limited to the example embodiments set forth herein. Like reference numerals in the drawings refer to like elements throughout the present disclosure.

Various modifications may be made to the example embodiments. However, it should be understood that these example embodiments are not construed as limited to the illustrated forms and include all changes, equivalents or alternatives within the idea and the technical scope of this disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

FIG. 1 is a diagram illustrating a three-dimensional (3D) display 100 according to at least one example embodiment.

A 3D display may be a display configured to provide a user with a 3D image. The 3D display may present different images to both eyes of a viewer and may allow the viewer to perceive a stereoscopic depth due to a binocular disparity.

The 3D display 100 may sense an interaction of a user with at least one 3D object. The interaction may be transferred using, for example, a finger 30 of the user or a 3D pen 50.

A 3D object may refer to content that has a 3D volume and that is included in a 3D digital image. The 3D digital image may include a 3D image for medical applications, for example, a computed tomography (CT) image, a magnetic resonance imaging (MRI) image, an ultrasonic image and/or a positron emission tomography (PET) image.

The 3D display 100 may correspond to various types of 3D displays, for example, glasses-based 3D displays, glasses-free eye-tracking 3D displays or glasses-free multi-view 3D displays. Hereinafter, an example involving a glasses-free eye-tracking 3D display will be described.

Referring to FIG. 1, the 3D display 100 may include a camera 110, a display panel 130 and a 3D converter 150.

The camera 110 may be a device to track eye positions of a user and to capture 3D information of a real world as a two-dimensional (2D) image.

The display panel 130 may be a device to change a color and a brightness value of an element occupying a desired area based on an electric signal. The element may be a pixel. A single pixel may include at least one subpixel, for example, red, green and blue subpixels.

The display panel 130 may include, for example, a plasma display panel (PDP), an organic light-emitting diode (OLED), a liquid crystal display (LCD) panel that uses a cold cathode fluorescent lamp (CCFL) and/or a light-emitting diode (LED) as backlight sources.

The 3D converter 150 may convert or control light passing through subpixels of the display panel 130 to traverse in a desired direction.

The 3D converter 150 may include a lenticular lens or a parallax barrier. The 3D converter 150 may also include a directional backlight unit (BLU) located in a rear side of the display panel 130 although not shown in the drawings.

The 3D display 100 may recognize a position of each of a right eye and a left eye of a user using the camera 110. The 3D display 100 may display a left image using subpixels corresponding to a ray traveling toward the left eye, and may display a right image using subpixels corresponding to a ray traveling toward the right eye.

The 3D display 100, based on the above eye tracking technique, may provide a 3D image that has excellent resolution, sharpness and stereoscopic depth. However, due to a stereoscopic depth of a 3D object displayed on the 3D display, it may be difficult to provide for user interaction in a z-axis direction using a mouse in a 3D space.

An apparatus for processing a 3D object (hereinafter, referred to as a "processing apparatus") according to at least one example embodiment may interpret an interaction of a user with the 3D object using a pen or finger, and may segment the 3D object based on the interpreted interaction. An example structure of the processing apparatus is discussed below with reference to FIGS. 7 and 8.

The expression "interpreting the interaction of the user" may indicate operations of sensing an input of the user to a 3D object displayed using the 3D display 100 and detecting x, y and z coordinates of landmark points corresponding to the input. For example, the user may perform an action corresponding to a user input in a 3D space using a pen or a finger. In this example, a 3D object perceptible to eyes of the user may not be real in the 3D space. The processing apparatus may determine which point of the 3D object corresponds to an input of the user sensed in the 3D space. For example, the processing apparatus may match an input of a user sensed in the 3D space to a desired point of a 3D object perceptible to eyes of the user by registering the 3D object and the input. The processing apparatus may segment the 3D object based on detected landmark points.

Also, the processing apparatus may interpret an interaction of a user with a plurality of 3D objects, and may register the plurality of 3D objects based on the interpreted interaction.

When a 3D object is incorrectly processed due to an incorrect interaction of a user with the 3D object, the processing apparatus may correct the incorrectly processed 3D object based on a depth continuity regularization. For example, when a depth of an overlapping area or portion of a 3D object is inaccurately represented due to an incorrect interaction of a user with the 3D object, the processing apparatus may correct the depth based on a depth continuity.

Figure 2:
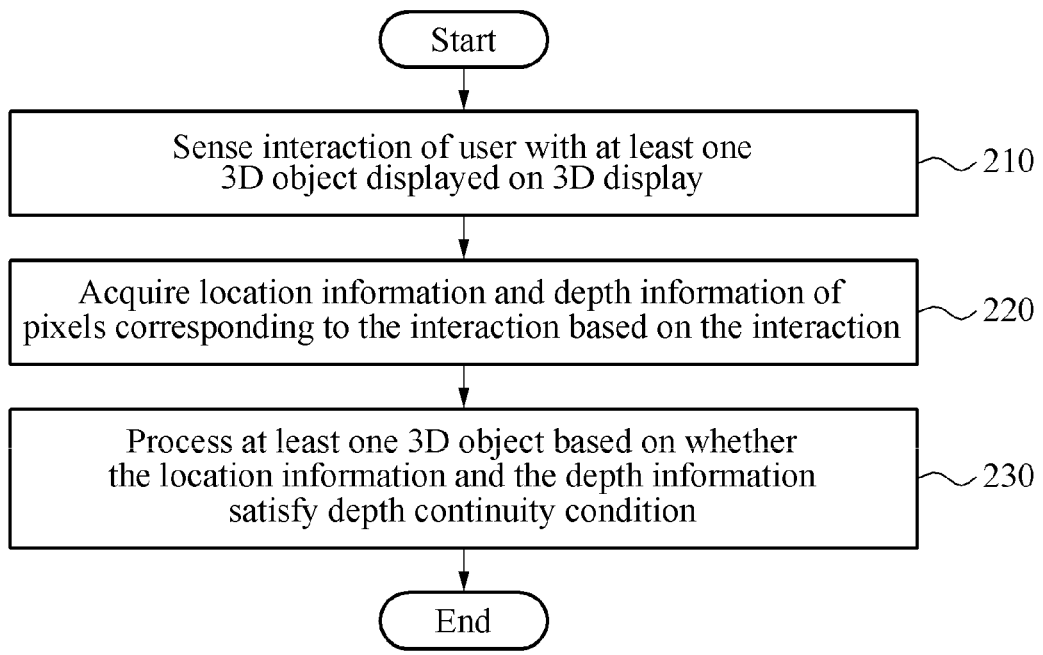
FIG. 2 is a flowchart illustrating a method of processing a 3D object according to at least one example embodiment.

FIG. 2 is a flowchart illustrating a method of processing a 3D object according to at least one example embodiment. Referring to FIG. 2, in operation 210, a processing apparatus (e.g., processing apparatus 800) according to at least one example embodiment may sense an interaction of a user with at least one 3D object displayed on a 3D display. The at least one 3D object may have a 3D mesh and a 3D volume.

In operation 220, the processing apparatus may acquire location information and depth information of pixels corresponding to the interaction sensed in operation 210, based on the interaction. The pixels may be understood to refer to voxels and voxel intensities. The location information of the pixels may be represented by 3D coordinates in the 3D display, or 2D coordinates. The location information of the pixels may be understood to represent x- and y-coordinates, and the depth information of the pixels may be understood to represent a z-coordinate.

In operation 230, the processing apparatus may process the at least one 3D object based on whether the location information and the depth information satisfy a depth continuity condition associated with a depth continuity. For example, the processing apparatus may segment a 3D object or may register a plurality of 3D objects based on whether the location information and the depth information satisfy the depth continuity condition.

Figure 3A:
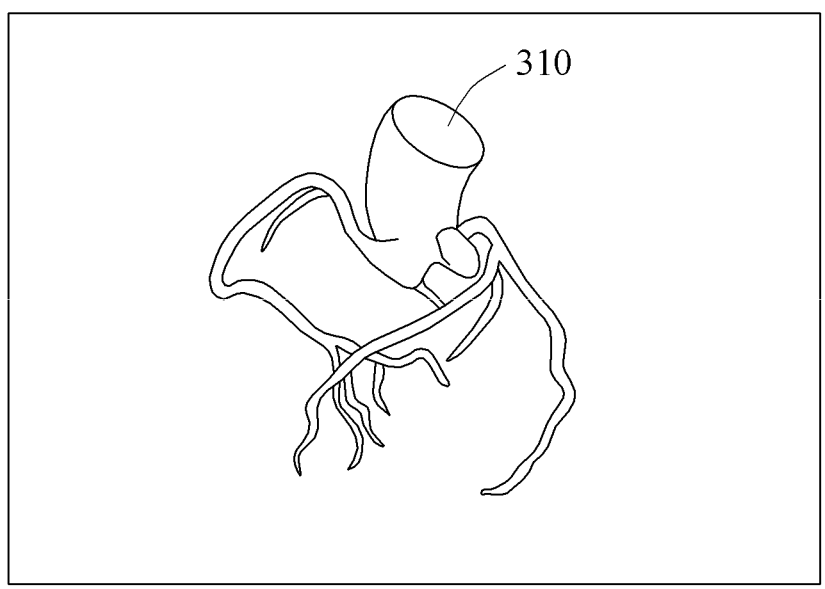
FIGS. 3A and 3B are diagrams illustrating an interaction of a user with a 3D object according to at least one example embodiment.
Figure 3B:
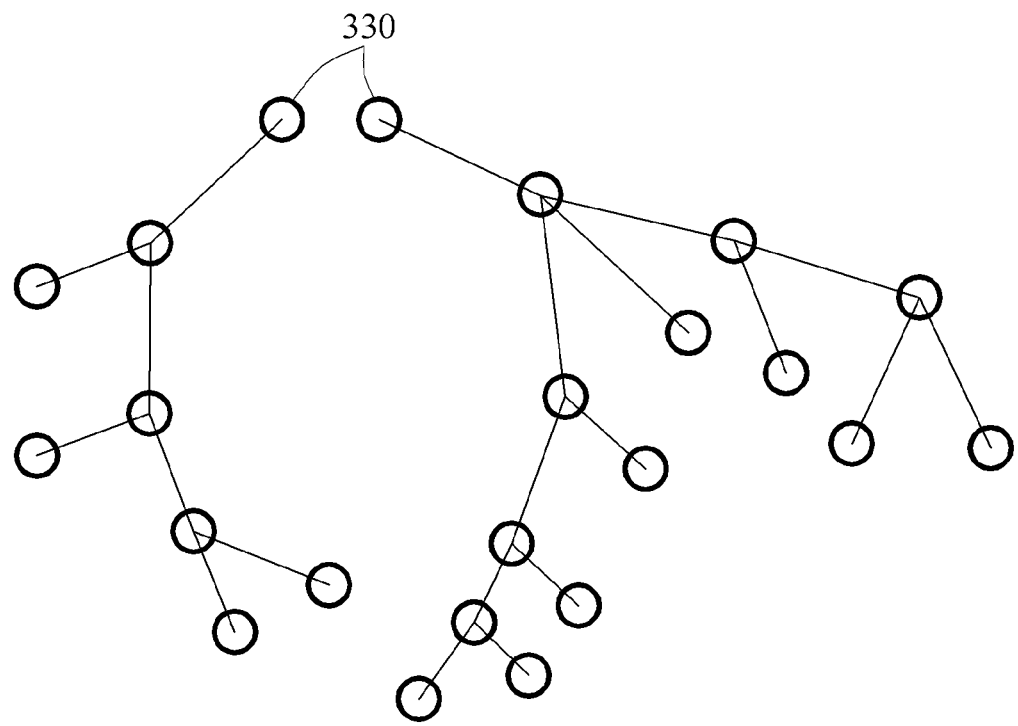

FIGS. 3A and 3B are diagrams illustrating an interaction of a user with a 3D object according to at least one example embodiment.

FIG. 3A illustrates a structure 310 of a coronary artery displayed on a 3D display, and 3B illustrates an interaction of a user with the structure 310. In other words, FIG. 3B illustrates landmark points 330 pointed to by the user. In the present specification, "pointing" may refer to various operations to designate a desired point or a desired area of a 3D object displayed on a 3D display, and may include, for example, pointing at a single point or marking desired areas.

The user may input an interaction with a 3D object displayed on a 3D display. The 3D object may be, for example, a 3D coronary artery on which volume rendering is performed based on medical data. The 3D object based on medical data (e.g., image data) is shown, however, 3D objects displayed on the 3D display may not be limited thereto.

The user may point at "n" landmark points 330 in a portion or an area of 3D objects displayed on the 3D display that the user desires to segment. The segmenting may be performed in an order from a starting point to an end point. The user may mark or point at the "n" landmark points 330 using a 3D pen in an order that the segmenting is to be performed.

A number "n" of the landmark points 330 may be understood as a minimum number to maintain a shape of a 3D object to be segmented. For example, to segment a toy doll displayed on a 3D display, landmark points may be marked on a portion of an external appearance of the toy doll, for example, a portion in which an angle rapidly changes and a portion in which a volume rapidly changes. In another example, to segment a blood vessel, landmark points may be marked on a starting point and an end point of the blood vessel and a joint separation point.

The landmark points 330 may be marked within an edge or a boundary of the 3D object.

The processing apparatus may acquire location information, depth information and a pixel intensity of each pixel in a 3D space from the landmark points 330 corresponding to the interaction, and may perform segmentation or registration based on the location information, the depth information and the pixel intensity.

Figure 4:
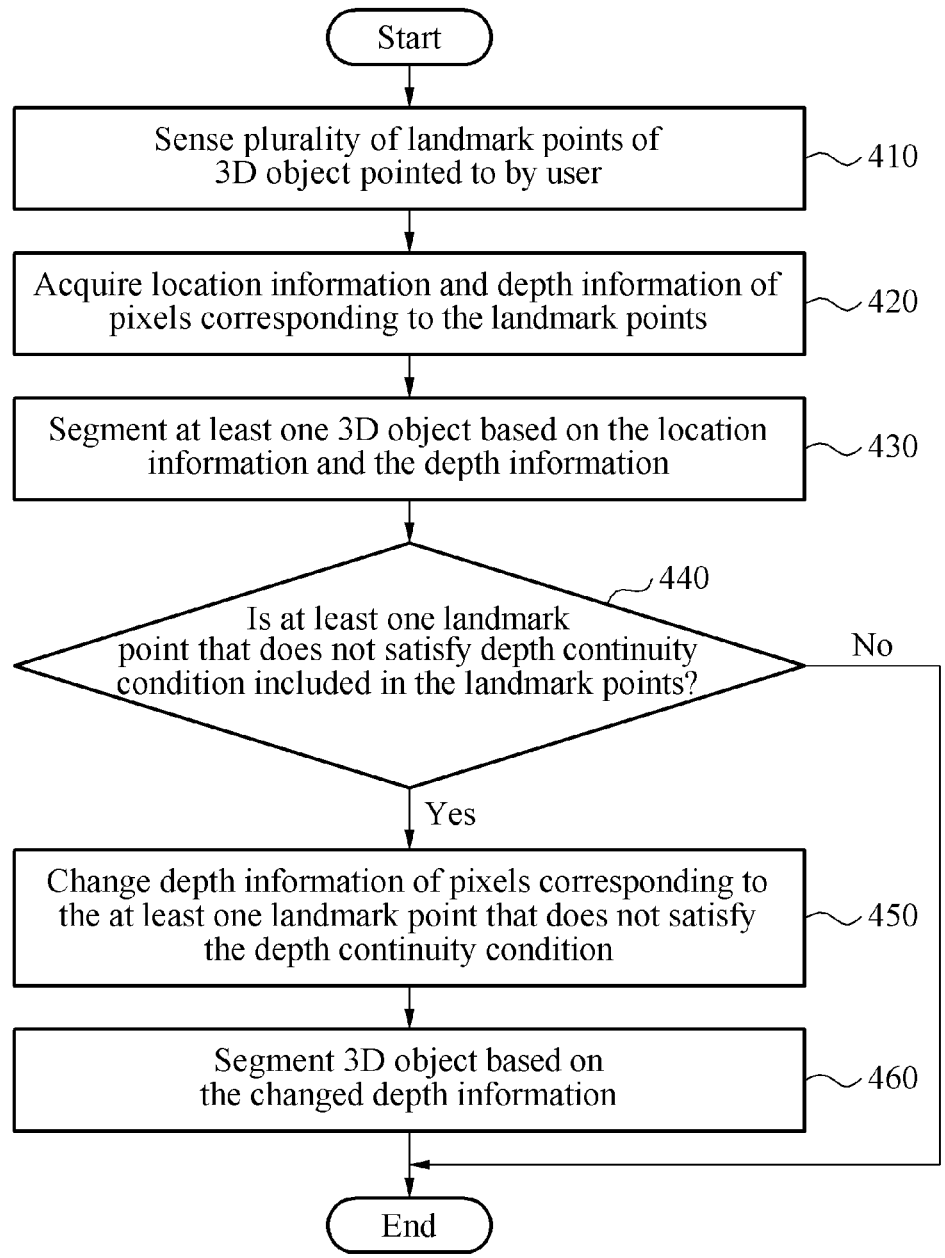
FIG. 4 is a flowchart illustrating a method of segmenting a 3D object according to at least one example embodiment.

FIG. 4 is a flowchart illustrating a method of segmenting a 3D object according to at least one example embodiment. Referring to FIG. 4, in operation 410, a processing apparatus (e.g., processing apparatus 800 in FIG. 8) according to at least one example embodiment may sense a plurality of landmark points of a 3D object pointed to by a user. The 3D object may be included in a stereo image visible to the user.

In operation 420, the processing apparatus may acquire location information and depth information of pixels corresponding to the landmark points. The location information and the depth information of the pixels corresponding to the landmark points may be acquired using the following schemes.

In an example, the processing apparatus may sense an input of a user to point at landmark points and may detect pixels corresponding to the input among a plurality of pixels of a 3D object. The detected pixels may correspond to landmark points pointed to by the user, and the processing apparatus may acquire location information and depth information of the detected pixels.

In another example, the processing apparatus may divide a desired space into a plurality of subspaces, and may form spatial coordinates of the plurality of subspaces. The processing apparatus may acquire location information and depth information of pixels corresponding to landmark points pointed to using the spatial coordinates.

In operation 430, the processing apparatus may segment at least one 3D object based on the location information and the depth information of the pixels. For example, under assumption that the landmark points are nodes of a graph, the processing apparatus may perform segmentation for each of the nodes from a starting node to a next node. The processing apparatus may perform segmentation between neighboring nodes. At a branch point with two edges, the processing apparatus may consider a closer node among nodes connected by one edge, may perform segmentation of the one edge, may return to the branch point and may perform segmentation of another edge.

In operation 440, the processing apparatus may determine whether at least one landmark point that does not satisfy a depth continuity condition is included in the sensed landmark points. The determining whether the at least one landmark point that does not satisfy the depth continuity condition is included in the sensed landmark points may be understood to indicate determining whether an incorrect input, unlike an original intention, is detected due to an inaccurate interaction of a user. For example, the processing apparatus may determine whether the at least one landmark point that does not satisfy the depth continuity condition is included in the landmark points, based on an input order and depth information of the sensed landmark points. Because the segmentation is performed in the order from the starting point to the end point as described above, the processing apparatus may determine, based on both the input order and the depth information of the landmark points, whether the at least one landmark point that does not satisfy the depth continuity condition is included in the landmark points.

The processing apparatus may determine whether a portion of a 3D object is incorrectly represented, based on whether depth information of pixels corresponding to at least one landmark point among the landmark points satisfies a depth continuity regularization and depth information of pixels corresponding to landmark points neighboring the at least one landmark point. A "depth continuity" may indicate that changes in 3D effects are similar among neighboring pixels during switching of scenes of a stereoscopic image so that a viewer may comfortably view the stereoscopic image. The "depth continuity regularization" may be understood to indicate that a change between depth information of pixels corresponding to neighboring landmark points does not exceed a desired reference change.

Figure 5:
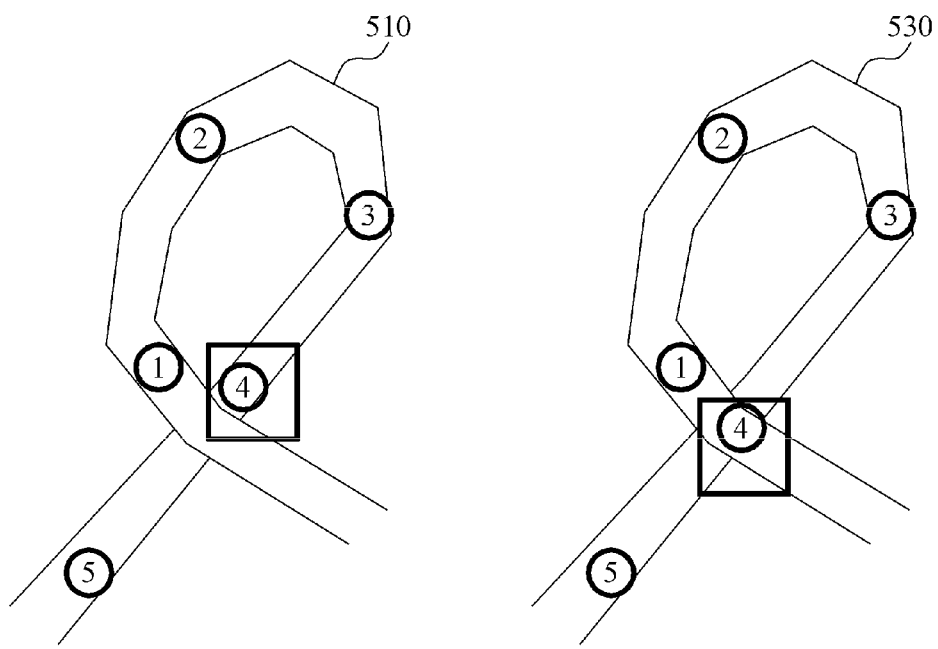
FIG. 5 illustrates an example of a method of determining, by an interaction of a user, whether a landmark point that does not satisfy a depth continuity condition exists according to at least one example embodiment.

For example, with reference to FIG. 5, depth information of pixels corresponding to a landmark point #3 may be assumed as "0.8." In this example, depth information of pixels corresponding to a landmark point #2 neighboring the landmark point #3, and depth information of pixels corresponding to a landmark point #4 neighboring the landmark point #3 may be assumed as "0.35" and "0.4," respectively.

A difference between the depth information of the pixels corresponding to the landmark point #2 and the depth information of the pixels corresponding to the landmark point #3 may be "0.45," and a difference between the depth information of the pixels corresponding to the landmark point #4 and the depth information of the pixels corresponding to the landmark point #3 may be "0.4." In this example, the processing apparatus may determine that the depth information of the pixels corresponding to the landmark point #3 does not satisfy the depth continuity regularization. A viewer may view a disparate 3D effect of an area corresponding to the landmark point #3.

For example, when depth information of pixels corresponding to a landmark point is different by at least "0.25" from depth information of pixels corresponding to neighboring landmark points, the processing apparatus may determine that the depth continuity regularization is not satisfied.

When it is determined that the at least one landmark point that does not satisfy the depth continuity condition is included in the landmark points in operation 440, the processing apparatus may change depth information of pixels corresponding to the at least one landmark point that does not satisfy the depth continuity condition in operation 450. In operation 450, the processing apparatus may change the depth information of the pixels corresponding to the at least one landmark point that does not satisfy the depth continuity condition, based on depth information of pixels corresponding to neighboring landmark points. To change the depth information of the pixels corresponding to the at least one landmark point that does not satisfy the depth continuity condition, the processing apparatus may use, for example, an average value of the depth information of the pixels corresponding to the neighboring landmark points, or a rate of change in depth information proportional to a distance between the at least one landmark point and the neighboring landmark points.

In operation 440, the processing apparatus may extract at least one landmark point that does not satisfy the depth continuity condition, and may change depth information of pixels corresponding to the extracted landmark point.

When it is determined that the at least one landmark point that does not satisfy the depth continuity condition does not exist in operation 440, the processing apparatus may terminate the method of FIG. 4.

In operation 460, the processing apparatus may segment the 3D object based on the depth information changed in operation 450. For example, the processing apparatus may perform segmentation using a graph-cut scheme or grab-cut scheme. In the graph-cut scheme or grab-cut scheme, a pixel intensity of each of landmark points sensed by the processing apparatus may be used as an input. The processing apparatus may also perform edge segmentation of a surface of a 3D object.

The processing apparatus may perform segmentation between landmark points based on a depth continuity for 3D objects. Based on the depth continuity, the processing apparatus may correct an error due to an incorrect interaction of a user with a 3D object having a twisted tubular structure or 3D objects that overlap each other.

The processing apparatus may correct an error in a user interaction by removing a landmark point that does not satisfy the depth continuity, or by adjusting a position or a depth of the landmark point.

FIG. 5 illustrates an example of a method of determining, by an interaction of a user, whether a landmark point that does not satisfy a depth continuity condition exists according to at least one example embodiment.

Referring to a left image of FIG. 5, an intended interaction may be accurately input when a user points at landmark points of a 3D object 510 having a twisted tubular structure using a 3D pen. Referring to a right image of FIG. 5, an interaction unlike an intention may be input when the user incorrectly points at landmark points of a 3D object 530 having a twisted tubular structure using a 3D pen.

A processing apparatus according to at least one example embodiment may use, for example, a depth continuity regularization to accurately process an overlapping area of the 3D object 530. In FIG. 5, a continuity between depth information corresponding to a landmark point #4 and depth information corresponding to neighboring landmark points, for example, landmark points #3 and #5 is not maintained. To maintain the continuity, the processing apparatus may connect the landmark point #3 directly to the landmark point #5 by removing the landmark point #4, or may change the depth information corresponding to the landmark point #4 to be connected to the landmark points #3 and #5.

The processing apparatus may process a 3D object so that the depth continuity may be satisfied, and may provide a precise segmentation result without an error despite an inaccurate interaction from a user.

Figure 6:
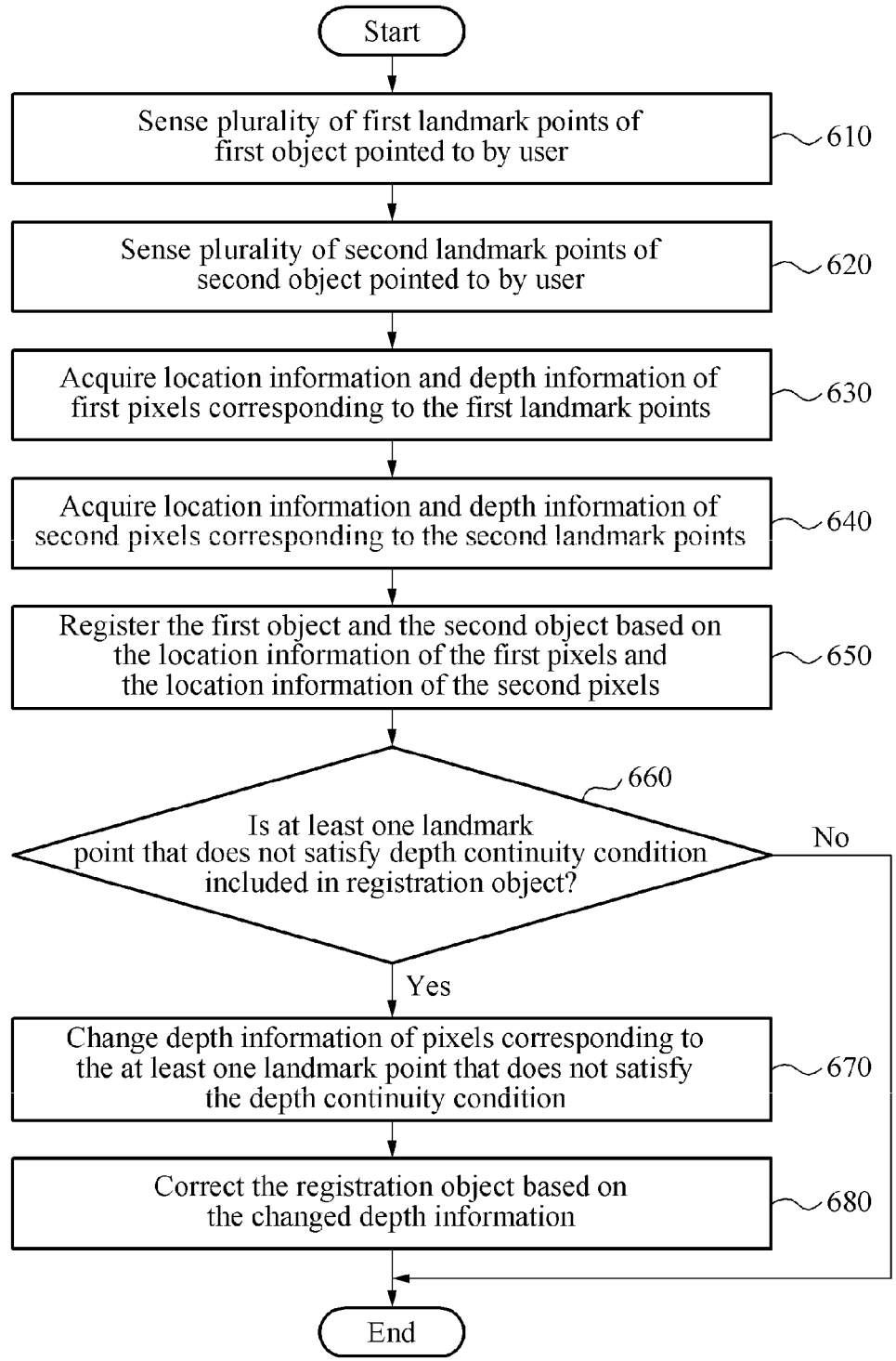
FIG. 6 is a flowchart illustrating a method of registering 3D objects displayed on a 3D display according to at least one example embodiment.

FIG. 6 is a flowchart illustrating a method of registering 3D objects displayed on a 3D display according to at least one example embodiment. Referring to FIG. 6, a processing apparatus (e.g., processing apparatus 800 in FIG. 8) according to at least one example embodiment may display a plurality of images on a single screen in the 3D display. The 3D display may display a first object included in a first image and a second object included in a second image different from the first image.

In operation 610, the processing apparatus may sense a plurality of first landmark points of the first object pointed to by a user.

In operation 620, the processing apparatus may sense a plurality of second landmark points of the second object pointed to by the user.

In operation 630, the processing apparatus may interpret an interaction of the user with the first object and may acquire location information and depth information of first pixels corresponding to the first landmark points.

In operation 640, the processing apparatus may interpret an interaction of the user with the second object and may acquire location information and depth information of second pixels corresponding to the second landmark points.

The processing apparatus may register the first object and the second object based on the location information and the depth information of the first pixels acquired in operation 630 and the location information and the depth information of the second pixels acquired in operation 640.

In operation 650, the processing apparatus may register the first object and the second object based on the location information of the first pixels and the location information of the second pixels.

In operation 660, the processing apparatus may determine whether at least one landmark point that does not satisfy a depth continuity condition among landmark points sensed by an interaction is included in a registration object generated by registering the first object and the second object in operation 650. The at least one landmark point that does not satisfy the depth continuity condition may be understood to indicate an incorrect input unlike an original intention due to an inaccurate interaction of a user.

In operation 660, the processing apparatus may determine whether the at least one landmark point that does not satisfy the depth continuity condition is included in the registration object, based on whether depth information of first pixels corresponding to at least one first landmark point and depth information of second pixels corresponding to at least one second landmark point satisfy a depth continuity regularization. Location information of the at least one first landmark point may correspond to location information of the at least one second landmark point.

When it is determined that the at least one landmark point that does not satisfy the depth continuity condition is included in the registration object in operation 660, the processing apparatus may change depth information of pixels corresponding to the at least one landmark point that does not satisfy the depth continuity condition in operation 670.

Based on a result of operation 660, the processing apparatus may extract the at least one landmark point that does not satisfy the depth continuity condition from the registration object, and may change depth information corresponding to pixels of the extracted landmark point.

In operation 670, the processing apparatus may change depth information that does not satisfy the depth continuity regularization based on depth information that satisfies the depth continuity regularization, among the depth information of the first pixels and the depth information of the second pixels.

In operation 680, the processing apparatus may correct the registration object generated in operation 650, based on the depth information changed in operation 670.

The processing apparatus may register 3D objects included in different images, based on a depth continuity for 3D. Based on the depth continuity, the processing apparatus may correct an error due to an incorrect interaction of a user with a 3D object.

Also, the processing apparatus may correct an error in an interaction of a user by removing a landmark point that does not satisfy the depth continuity from a 3D object included in a single image, or by correcting a depth or a position of the landmark point based on location information and depth information of a 3D object included in another image.

Figure 7:
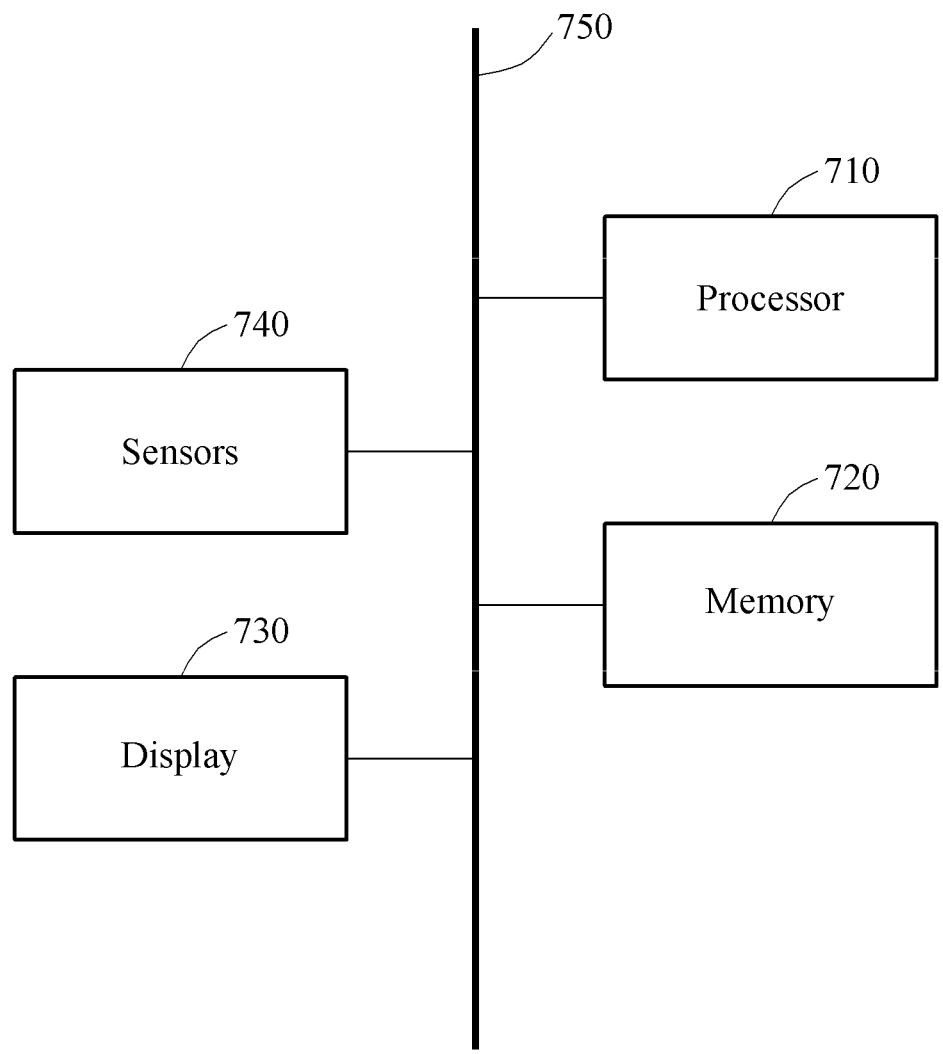
FIG. 7 is a block diagram illustrating an example of a processing apparatus for processing a 3D object according to at least one example embodiment.

FIG. 7 is a block diagram illustrating a processing apparatus 700 for processing a 3D object according to at least one example embodiment. Referring to FIG. 7, the processing apparatus 700 may include a processor 710, a memory 720, a display 730 and at least one sensor or sensors 740. The processor 710, the memory 720, the display 730 and the sensors 740 may communicate with each other via a bus 750. The processor 710 may acquire location information and depth information of pixels corresponding to landmark points pointed to on the display 730 and may process at least one 3D object based on the location information and the depth information of the pixels.

The processor 710 may segment the at least one 3D object based on the location information of the pixels and may determine whether a portion of the segmented 3D object is incorrectly represented due to pointing, that is, whether at least one landmark point that does not satisfy a depth continuity condition is included in the segmented 3D object. When the portion is determined to be incorrectly represented, the processor 710 may change depth information of pixels corresponding to the portion.

The sensors 740 may sense a plurality of first landmark points of a first object pointed to by a user, and may sense a plurality of second landmark points of a second object pointed to by the user. The processor 710 may interpret an interaction of the user with the first object and may acquire location information and depth information of first pixels corresponding to the first landmark points. Also, the processor 710 may interpret an interaction of the user with the second object and may acquire location information and depth information of second pixels corresponding to the second landmark points.

The processor 710 may register the first object and the second object based on the location information of the first pixels and the location information of the second pixels to generate a registration object. The processor 710 may determine, based on an interaction, whether at least one landmark point that does not satisfy the depth continuity condition is included in the registration object. When it is determined that the at least one landmark point that does not satisfy the depth continuity condition is included in the registration object, the processor 710 may change depth information of pixels corresponding to the at least one landmark point that does not satisfy the depth continuity condition.

The processor 710 may perform at least one of the methods described above with reference to FIGS. 1 through 6. The processor 710 may be a special purpose processor and may execute a program or computer-readable instructions and may control the processing apparatus 700. A program code executed by the processor 710 may be stored in the memory 720. The processing apparatus 700 may be connected to an external device (for example, a personal computer (PC) or a network) via an input/output device (not shown), and may exchange data with the external device. Although not explicitly shown, it should be understood that one or more of the processor 710, the memory 720, the display 730, and the sensors 740 may be implemented as separate devices. For example, the processor 710 and the memory 720 may be embodied in a device separate from the sensors 740 and the display 730. However, example embodiments are not limited thereto.

At least one of the methods described above with reference to FIGS. 1 through 6 may be used in combination with software used to edit a 3D image or a 3D graphics image. The at least one of the methods described above with reference to FIGS. 1 through 6 may be implemented as an application running in a processor in a tablet or a smartphone, or may be included as a chip in a display.

The display 730 may display image data stored in a desired region of the memory 720 based on a control of the processor 710. The display 730 may be a 3D display, for example, a glasses-free eye-tracking 3D display, a glasses-free multiview display or a glasses-based 3D display.

The display 730 may display 3D objects included in different images. The 3D objects may be the same.

The sensors 740 may sense a plurality of landmark points of at least one 3D object displayed on the display 730 pointed to by the user.

The sensors 740 may receive a user input using a desired scheme (for example, a scheme of converting an optical image to an electric signal). For convenience of description, an example in which the display 730 and the sensors 740 are separate from each other has been described, however, there is no limitation thereto. Accordingly, the display 730 and the sensors 740 may be integrally formed as a touch display.

The display 730 may be a 3D display to three-dimensionally play back the image data stored in the desired region of the memory 720.

Figure 8:
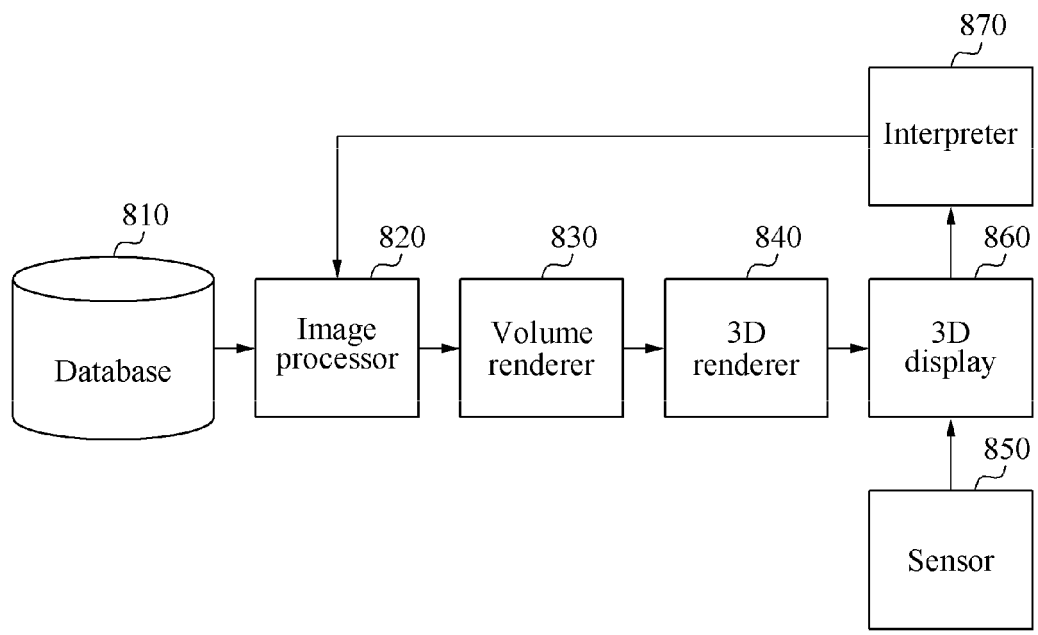
FIG. 8 is a block diagram illustrating another example of a processing apparatus for processing a 3D object according to at least one example embodiment.

FIG. 8 is a block diagram illustrating a processing apparatus 800 for processing a 3D object according to at least one example embodiment.

Referring to FIG. 8, the processing apparatus 800 may include a database 810, an image processor 820, a volume renderer 830, a 3D renderer 840, a sensor 850, a 3D display 860 and an interpreter 870.

The database 810 may store 3D images.

The image processor 820 may process the 3D images stored in the database 810 based on location information and depth information of pixels corresponding to landmark points received from the interpreter 870. The image processor 820 may perform segmentation or registration based on the location information and the depth information of the pixels so that the 3D images stored in the database 810 may satisfy a depth continuity regularization. The image processor 820 may use, for example, a graph-cut scheme or a grab-cut scheme to perform segmentation.

The volume renderer 830 may perform graphics processing on the 3D images processed by the image processor 820. For example, the volume renderer 830 may process colors or brightness of the 3D images colors, or may generate 3D meshes based on the 3D images.

The 3D renderer 840 may render an image processed by the volume renderer 830 to be a stereo image so that the stereo image may be played on a 3D display device. The sensor 850 may sense an interaction of a user with a 3D object displayed on the 3D display 860. The interaction may be, for example, pointing at landmark points using a pen or a finger.

The 3D display 860 may display the 3D images stored in the database 810.

The interpreter 870 may interpret the interaction sensed by the sensor 850. Location information and depth information of pixels corresponding to landmark points pointed through the interaction interpreted by the interpreter 870 may be acquired.

According to an example embodiment, the interpreter 870 may be included in the processing apparatus 800 or may be separate from the processing apparatus 800. With reference to FIG. 7, the processor 710 may implement the above described functions of the image processor 820, the volume renderer 830, the 3D renderer 840 and/or the interpreter 870.

The units and/or modules described herein may be implemented using hardware components, software components, or a combination thereof. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing a three-dimensional (3D) object, the method comprising:
   sensing, as a first landmark point of at least one 3D object displayed on a 3D display, an interaction of a user with the at least one 3D object and sensing, as a plurality of landmark points of the at least one 3D object, points of the at least one 3D object pointed to by the user, and the plurality of landmark points includes the first landmark point;
   acquiring location information and depth information of pixels corresponding to the sensed plurality of landmark points and interpreting the sensed interaction;
   determining whether to adjust the depth information of the pixels corresponding to the first landmark point of the at least one 3D object based on whether the location information and the depth information satisfy a depth continuity condition;
   segmenting the at least one 3D object based on the location information and the depth information of the pixels corresponding to the sensed plurality of landmark points;
   determining whether at least one landmark point that does not satisfy the depth continuity condition is included in the sensed plurality of landmark points and determining whether the at least one landmark point that does not satisfy the depth continuity condition is included in the sensed landmark points based on whether depth information of pixels corresponding to at least one landmark point;
   satisfies a depth continuity regularization, and whether depth information of pixels corresponds to landmark points neighboring the at least one landmark point; and
   changing, if the at least one landmark point exists in the sensed plurality of landmark points, depth information of pixels corresponding to the at least one landmark point.

2. The method of claim 1, wherein the determining determines whether the at least one landmark point that does not satisfy the depth continuity condition is included in the sensed plurality of landmark points based on an input order and depth information of the sensed plurality of landmark points.

3. The method of claim 1, wherein the changing changes the depth information of the pixels corresponding to the at least one landmark point based on the depth information of the pixels corresponding to the neighboring landmark points.

4. The method of claim 1, wherein the changing comprises:
   extracting the at least one landmark point; and
   changing depth information of pixels corresponding to the extracted at least one landmark point.

5. The method of claim 1, wherein the at least one 3D object comprises a first object included in a first image and a second object included in a second image different from the first image, and
   wherein the sensing comprises,
      sensing a first plurality of landmark points of the first object pointed to by the user, and
      sensing a second plurality of landmark points of the second object pointed to by the user.

6. The method of claim 5, wherein the acquiring comprises:
   interpreting the sensed interaction of the user with the first object and acquiring location information and depth information of first pixels corresponding to the first plurality of landmark points; and interpreting the sensed interaction of the user with the second object and acquiring location information and depth information of second pixels corresponding to the second plurality of landmark points.

7. The method of claim 6, wherein the processing comprises registering the first object and the second object based on the location information and the depth information of the first pixels and the location information and the depth information of the second pixels.

8. The method of claim 7, wherein the registering comprises:
registering the first object and the second object based on the location information of the first pixels and the location information of the second pixels;
determining, based on depth information of the sensed first and second landmark, whether at least one landmark point that does not satisfy the depth continuity condition is included in a registration object generated by the registering;
extracting, if the least at least one landmark point exists in the registration object, the at least one landmark point; and
changing depth information of pixels corresponding to the extracted at least one landmark point.

9. The method of claim 8, wherein the determining determines whether the at least one landmark point that does not satisfy the depth continuity condition is included in the registration object based on whether depth information of first pixels corresponding to at least one landmark point of the first plurality of landmark points and depth information of second pixels corresponding to at least one landmark point of the second plurality of landmark points satisfy a depth continuity regularization, and whether location information of the at least one landmark point of the first plurality of landmark points corresponds to location information of the at least one landmark point of the second plurality of landmark points.

10. The method of claim 9, wherein the changing changes depth information that does not satisfy the depth continuity regularization based on depth information that satisfies the depth continuity regularization from among the depth information of the first pixels and the depth information of the second pixels.

11. A non-transitory computer-readable storage medium storing computer-readable instructions for causing a processor to perform the method of claim 1.

12. An apparatus for processing a three-dimensional (3D) object, the apparatus comprising:
at least one sensor configured to sense a plurality of landmark points of at least one 3D object, the plurality of landmark points being points pointed to by a user, the at least one 3D object being displayed on a 3D display;
memory storing computer-readable instructions; and
a processor configured to execute the computer-readable instructions such that the processor is configured to,
acquire location information and depth information of pixels corresponding to the sensed plurality of landmark points, and
determine whether to adjust depth information of pixels corresponding to at least one landmark point, from among the plurality of landmark points, based on whether the acquired location information and depth information of the at least one landmark point satisfy a depth continuity condition,
segment the at least one 3D object based on the location information and the depth information of the pixels corresponding to the sensed plurality of landmark points,
determine whether at least one landmark point that does not satisfy the depth continuity condition is included in the sensed plurality of landmark points and determining whether the at least one landmark point that does not satisfy the depth continuity condition is included in the sensed landmark points based on whether depth information of pixels corresponding to at least one landmark point satisfies a depth continuity regularization, and whether depth information of pixels corresponds to landmark points neighboring the at least one landmark point,
change, if the at least one landmark point exists in the sensed plurality of landmark points, depth information of pixels corresponding to the at least one landmark point.

13. The apparatus of claim 12, wherein the at least one 3D object comprises a first object included in a first image and a second object included in a second image different from the first image,
wherein the at least one sensor is configured to sense a first plurality of landmark points of the first object pointed to by the user and a second plurality of landmark points of the second object pointed to by the user, and
wherein the processor is configured to execute the computer-readable instructions such that the processor is configured to,
interpret an interaction of the user with the first object,
acquire location information and depth information of first pixels corresponding to the first plurality of landmark points,
interpret an interaction of the user with the second object, and
acquire location information and depth information of second pixels corresponding to the second plurality of landmark points.

14. The apparatus of claim 13, wherein the processor is configured to execute the computer-readable instructions such that the processor is configured to register the first object and the second object based on the location information of the first pixels and the location information of the second pixels to generate a registration object, and to change depth information that does not satisfy a depth continuity regularization based on depth information that satisfies the depth continuity regularization from among the depth information of the first pixels and the depth information of the second pixels in the registration object.

* * * * *